United States Patent
Clark et al.

(10) Patent No.: US 6,752,419 B1
(45) Date of Patent: Jun. 22, 2004

(54) AIR BAG SENSOR MODULE FASTENING DEVICE

(75) Inventors: Jeffrey Allen Clark, Sterling Heights, MI (US); Brian Michael Curtis, Orion, MI (US); Andrew Joseph Wisniewski, Eastpointe, MI (US)

(73) Assignee: Siemens VDO Automotive Corporation, Auburn Hill, MI (US)

( * ) Notice: Subject to any disclaimer, the term of this patent is extended or adjusted under 35 U.S.C. 154(b) by 438 days.

(21) Appl. No.: 09/592,080

(22) Filed: Jun. 12, 2000

Related U.S. Application Data

(60) Provisional application No. 60/153,427, filed on Sep. 10, 1999.

(51) Int. Cl.$^7$ .......................... B60R 21/32; F16B 39/00
(52) U.S. Cl. ...................... 280/734; 411/107; 411/999
(58) Field of Search ................................ 411/107, 999, 411/352, 353; 280/734

(56) References Cited

U.S. PATENT DOCUMENTS

| | | | | |
|---|---|---|---|---|
| 1,719,301 A | * | 7/1929 | Metcalf | |
| 1,927,780 A | * | 9/1933 | Anderson | |
| 3,018,127 A | * | 1/1962 | Dobrosielski | |
| 4,929,137 A | * | 5/1990 | Bossenmaier | |
| 6,106,207 A | * | 8/2000 | Kuzdak | |

FOREIGN PATENT DOCUMENTS

DE 197 42 456 A1 * 4/1999

* cited by examiner

Primary Examiner—Flemming Saether

(57) ABSTRACT

An air bag sensor module fastening device for a vehicle is provided includes a vehicle mounting structure having an internally threaded member. A sensor is secured to a base for sensing vibrations caused by a crash of the vehicle. The base has an aperture extending therethrough that is aligned with the internally threaded member. The aperture includes a retaining portion. A fastener for securing the base to the vehicle mounting structure has a shaft with a head and a threaded portion opposite the head. The threaded portion is temporarily retained within the retaining portion in a shipping position. The threaded portion has a minor diameter and the shaft portion has a shaft diameter less than the minor diameter. As a result, the shaft will not be in an interference fit relationship with the retaining portion so that the compressive load of the fastener alone secures the base to the vehicle mounting structure. The threaded portion is disposed outside of the retaining portion in an installed position in which the threaded portion is received in the internally threaded member to secure the base to the vehicle mounting structure. In this manner, the threaded portion will engage only the internally threaded member so that the base is secured to the vehicle mounting structure by the compressive load of the fastener alone.

6 Claims, 1 Drawing Sheet

AIR BAG SENSOR MODULE FASTENING DEVICE

This application claims priority to provisional application serial no. 60/153,427 filed Sep. 10, 1999.

BACKGROUND OF THE INVENTION

This invention relates to air bag sensor modules that are secured to the vehicle structure for transmission of crash pulses, and more specifically, the invention relates to a fastening device for securing the module to the vehicle structure.

Air bag sensor modules include a crash sensor and are mounted on the vehicle structure in a manner to transmit crash information from the vehicle structure to the crash sensor. Diagnostic circuits evaluate the crash information and discriminate between a fire and a no fire condition. To this end, the air bag sensor module is mounted on the vehicle such that the crash sensor will be subject to forces that indicate a crash condition. For example, the crash sensor usually comprises an accelerometer and the air bag module is rigidly coupled to a portion of the vehicle such that deceleration indicative of a crash condition is transmitted to the crash sensor. When a crash condition requiring air bag deployment is detected, the controller associated with the air bag module sends a signal to ignite an air bag deployment device.

To ensure that the forces are properly transmitted from the vehicle structure to the crash sensor, the module must be securely fastened to the vehicle structure. Typically, the manufacturer of the module supplies the module to the vehicle manufacture, which provides the fastening elements used to secure the module to the vehicle structure and installs the module onto the vehicle structure. Preferably, the fastening elements are secured to the vehicle structure only under the compressive load of a threaded fastener to ensure optimal crash pulse transmission. By having the vehicle manufacturer supply the necessary fastening elements, variables are introduced that may compromise proper installation of the module and inhibit crash pulse transmission. For example, the threads of the fastener may engage both the module and the vehicle structure so that the module is not secured to the vehicle structure by compressive load alone. Additionally, the shaft of the fastener may be in an interference fit relationship with a module mounting hole, again preventing the module from being secured to the vehicle structure by compressive load alone. Therefore what is needed is a fastening device which secures the module to the vehicle structure only by the compressive load of the fasteners to ensure optimal crash pulse transmission.

SUMMARY OF THE INVENTION AND ADVANTAGES

The present invention provides an air bag sensor module fastening device for a vehicle. The fastening device includes a vehicle mounting structure having an internally threaded member. A sensor is secured to a base for sensing vibrations caused by a crash of the vehicle. The base has an aperture extending therethrough that is aligned with the internally threaded member. The aperture includes a retaining portion. A fastener for securing the base to the vehicle mounting structure has a shaft with a head and a threaded portion opposite the head.

The threaded portion is temporarily retained within the retaining portion in a shipping position. The threaded portion has a minor diameter and the shaft portion has a shaft diameter less than the minor diameter. As a result, the shaft will not be in an interference fit relationship with the retaining portion so that the compressive load of the fastener alone secures the base to the vehicle mounting structure. The threaded portion is disposed outside of the retaining portion in an installed position in which the threaded portion is received in the internally threaded member to secure the base to the vehicle mounting structure. In this manner, the threaded portion will engage only the internally threaded member so that the base is secured to the vehicle mounting structure by the compressive load of the fastener alone.

Accordingly, the Dove invention provides a fastening device which secures the module to the vehicle structure only by the compressive load of the fasteners to ensure optimal crash pulse transmission.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
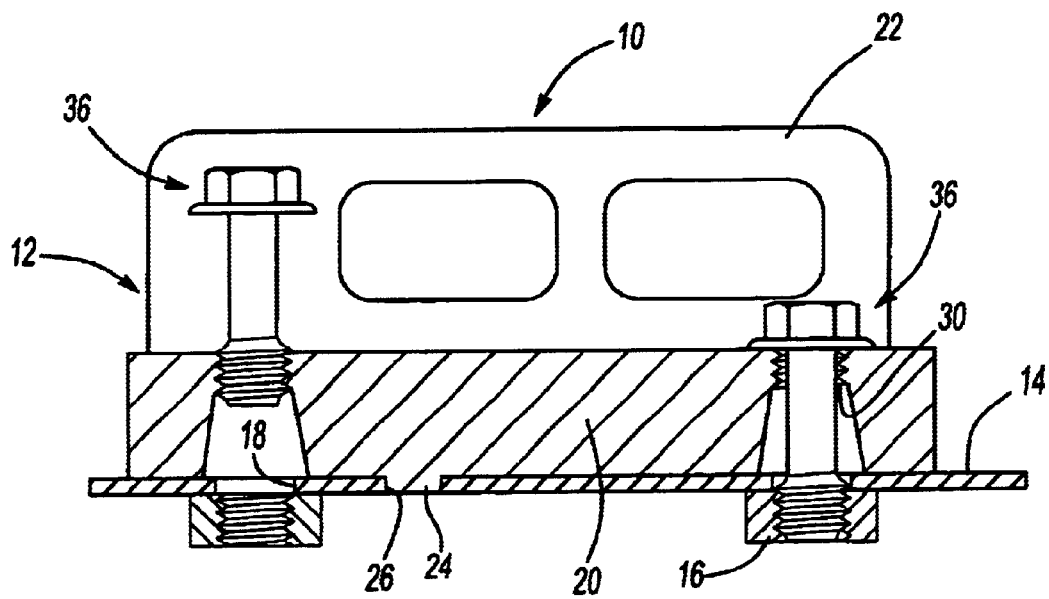
FIG. 1 is a partial cross-sectional side view of an air bag sensor module of the present invention fastening device with a fastener in shipping and installed positions.
Figure 3:
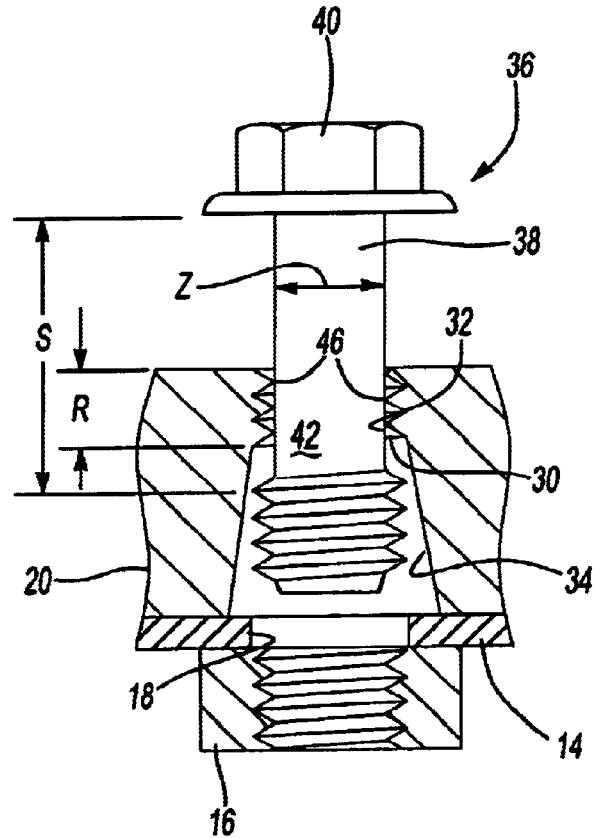
FIG. 3 is an enlarged partial cross-sectional view of the fastener in a transient position preceding the installed position.

An air bag sensor module 10 for a vehicle is shown in FIG. 1. The module 10 includes a fastening device 12 that has a vehicle mounting structure 14 with an internally threaded member 16. As shown in FIGS. 1 and 3, the internally threaded member 16 may be a nut that is secured to one side of the mounting structure 14 and aligned with a hole 18 in the structure 14. The internally threaded member 16 may also be integrally formed with the mounting structure such as a hole through the mounting structure 14 that specially adapted to receive and retain a fastener. The module 10 has a base 20 with a sensor 22 secured thereto for sensing vibrations caused by a crash of the vehicle. The sensor 22 and base 20 may be formed as single unit or as separate components. Typically, the base 20 includes a protrusion 24 that is received within a locating hole 26 in the mounting structure 14 for positioning the module 10 relative to the structure 14. The base 20 may be manufactured from plastic or metal.

Figure 2:
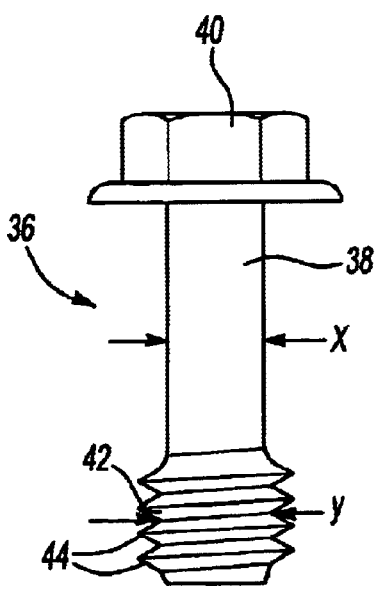
FIG. 2 is side view of the fastener of the present invention.

The base 20 has an aperture 30, typically three or four, extending through the base 20 and positioned to align with the internally threaded members 16. The aperture 30 includes a retaining portion 32 and preferably a pocket 34 adjacent to the retaining portion 32. Fasteners 36 are received within the apertures 30 for securing the base 20 to the vehicle mounting structure 14. Referring to FIG. 2, the fastener 36 has a shaft 38 with a head 40 and a threaded portion 42 opposite the head 40. Threads 44 on the threaded portion 42 are enlarged in the Figure for clarity. The shaft 38 has a shaft diameter X, and the threaded portion 42 has a minor diameter Y defined by the root or valley of the threads 44.

The fastener 36 has a shipping position (shown on the left side of FIG. 1), an installed position (shown on the right side of FIG. 1), and a transient position (shown in FIG. 3) in which the fastener 36 is being moved from the shipping position to the installed position. The threaded portion 42 is temporarily retained within the retaining portion 32 in a shipping position so that the module 10 may be shipped with the fasteners 36 to avoid variables leading to poor crash pulse transmission, discussed above. The retaining portion 32 has threads 46 that have a retaining portion minor diameter Z defined by the crest or peak of the threads 46. The threaded portion 42 may be received in the retaining portion 32 by an interference fit or the base 20 may be molded or cast about the threaded portion 42. If the base 20 is molded or cast about the threaded portion 42, the retaining material will be disposed within the retaining portion 32, which will prevent the fastener from being installed into the internally threaded member 16. Self-tapping threads may be used to cut through the retaining material when moved from the shipping position to the installed position.

The present invention provides a fastener 36 with a threaded portion 42 having a minor diameter Y greater than the shaft diameter X. Similarly, the minor diameter Z of the retaining portion 32 wills be greater that the shaft diameter X. As a result, the shaft 38 will not be in an interference fit relationship with the retaining portion 32 so that the compressive load of the fastener 36 alone secures the base 20 to the vehicle mounting structure 14. Said another way, the minor diameter Z of the retaining portion 32 will not engage the shaft 38 because the shaft diameter X is smaller that the minor diameter Z.

As discussed above, it is undesirable to have the threaded portion 42 engage both the base 20 and the internally threaded member 16. Accordingly, it is preferable to have the threaded portion 42 disposed outside of the retaining portion 32 when in the installed position so that the threaded portion 42 only engages the internally threaded member 16. In this manner, the threaded portion 42 will engage only the internally threaded member 16 so that the base 20 is secured to the vehicle mounting structure 14 by the compressive load of the fastener 36 alone. To this end, the present invention utilized a fastener 36 that has a shaft length S greater that the retaining portion depth R If the base 20 does not have a pocket 34 as shown in the Figures, then the shaft length S may need be the greater than the depth of the aperture 30.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. An air bag sensor module for a vehicle comprising:
a base having an aperture extending therethrough, said aperture having a retaining portion;
a sensor secured to said base for sensing vibrations caused by a crash of the vehicle;
a fastener having a shaft with a head and a threaded portion opposite said head with said threaded portion temporarily retained with said retaining portion in a shipping position, said threaded portion having a minor diameter with said shaft portion having a shaft diameter less than said minor diameter and said threaded portion comprising self-tapping threads; and
wherein said base includes retaining material disposed within said retaining portion, said self-tapping threads cutting through said retaining material when moved from said shipping position to an installed position.

2. The module according to claim 1, wherein said base is molded about said fastener.

3. The module according to claim 2, wherein said base comprise plastic.

4. An air bag sensor module for a vehicle comprising:
a base having an aperture extending therethrough, said aperture having a retaining portion;
a sensor secured to said base for sensing vibrations caused by a crash of the vehicle;
a fastener having a shaft with a head and a threaded portion opposite said head with said threaded portion temporarily retained within said retaining portion in a shipping position, said threaded portion having a minor diameter with said shaft portion having a shaft diameter less than said minor diameter; and
wherein said aperture includes a pocket adjacent to said retaining portion opposite said head, said threaded portion being disposed within said pocket in a transient position.

5. An air bag sensor module fastening device for a vehicle comprising:
a vehicle mounting structure having an internally threaded member;
a base having an aperture extending therethrough and aligned with said internally threaded member said aperture having a retaining portion;
a sensor secured to said base for sensing vibrations caused by a crash of the vehicle;
a fastener for securing said base to said vehicle mounting structure said fastener having a shaft with a head and a threaded portion opposite said head with said threaded portion temporarily retained within said retaining portion in a shipping position, said threaded portion comprising self-tapping threads and said threaded portion being disposed outside of said retaining portion in an installed position in which said threaded portion is received in said internally threaded member to secure said base to said vehicle mounting structure; and
wherein said base includes retaining material disposed within said retaining portion, said self-tapping threads cutting through said retaining material when moved from said shipping position to an installed position.

6. An air bag sensor module fastening device for a vehicle comprising:
a vehicle mounting structure having an internally threaded member;
a base having an aperture extending therethrough and aligned with said internally threaded member, said aperture having a retaining portion;
a sensor secured to said base for sensing vibrations caused by a crash of the vehicle;
a fastener for securing said base to said vehicle mounting structure said fastener having a shaft with a head and a threaded portion in a shipping position, and said portion temporarily retained within said retaining portion in a shipping position, and said threaded portion being disposed outside of said retaining portion in a installed position in which said threaded portion is received in said internally threaded member to secure said base to said vehicle mounting structure; and
wherein said aperture includes a pocket adjacent to said retaining portion opposite said head, said threaded portion being disposed within said pocket in a transient position.

* * * * *